METHOD OF MAKING ROD MEMORY SOLENOID CONSTRUCTION

INVENTOR
DONAL A. MEIER

BY Lorus A. Kline
John T. Matlago
Nathan Cass
HIS ATTORNEYS

INVENTOR
DONAL A. MEIER

BY Louis A. Kline
John T. Matlago
Nathan Cass
HIS ATTORNEYS

April 29, 1969 D. A. MEIER 3,440,719

METHOD OF MAKING ROD MEMORY SOLENOID CONSTRUCTION

Filed Aug. 6, 1965 Sheet 3 of 5

INVENTOR
DONAL A. MEIER

BY Louis A. Kline
John J. Maclago
Nathan Cass
HIS ATTORNEYS

INVENTOR
DONAL A. MEIER

BY Louis A. Kline
John J. Matlago
Nathan Cass
HIS ATTORNEYS

INVENTOR
DONAL A. MEIER

Louis A. Kline
BY John J. Matlago
Nathan Cass
HIS ATTORNEYS

United States Patent Office 3,440,719
Patented Apr. 29, 1969

3,440,719

METHOD OF MAKING ROD MEMORY SOLENOID CONSTRUCTION

Donal A. Meier, Inglewood, Calif., assignor to The National Cash Register Company, Dayton, Ohio, a corporation of Maryland Filed Aug. 6, 1965, Ser. No. 477,794
Int. Cl. H01f 7/06; G11b 5/00
U.S. Cl. 29—604 3 Claims

ABSTRACT OF THE DISCLOSURE

A method of constructing a memory array comprised of parallel bistable magnetic rods, arranged upright in rows and columns of a plane, and a weaving pattern of insulated conductive wires woven perpendicular to the rods, which includes the steps of weaving a plurality of first coordinate drives of conductive wires and then weaving a plurality of second coordinate drives of conductive wires so that a different combination of first and second coordinate drives is formed by the weaving pattern for each rod.

This invention relates generally to magnetic memories, and more particularly to improvements in rod memories of the type illustrated, for example, in Patent No. 3,134,-965, issued May 26, 1964, and in the commonly assigned copending patent application Ser. No. 795,934, filed Feb. 27, 1959, and now Patent No. 3,228,012.

In the magnetic memories disclosed in the aforementioned patent and patent application, an array of suitably interconnected solenoids is provided with magnetic rods passing through bores in the solenoids. Each rod has a rod-like inner conductive substrate on which is suitably deposited a thin film magnetic coating having bistable magnetic switching properties, a discrete portion of which is capable of being switched from either state to the other in response to current applied to the solenoids respectively coupled thereto. The importance of such a magnetic memory construction and arrangement resides not only in the ease of fabricating relatively compact high density magnetic memories, but also, in the very high speed switching capability of such memories achieved because, unlike other known memory constructions and arrangements (such as those using "twistors"), these rod memories as disclosed in the aforementioned patent and application permit the use of rods with thin magnetic films of less than 10,000 angstroms.

Although such rod memories as disclosed in the aforementioned patent and application permit the construction of relatively compact high speed rod memory structures, the increasing emphasis on size reduction has resulted in a continiuing search for means and methods for constructing even more compact rod memories, while at the same time maintaining, and if possible, improving their performance characteristics. It is towards these ends that the present invention is directed.

Accordingly, it is the broad object of this invention to provide improved rod memory construction methods and arrangements whereby a significantly more compact memory construction can be achieved.

A more specific object of this invention is to provide an improved rod memory construction whereby one or more solenoid windings are provided for each of a plurality of magnetic rods in a manner which permits a rod array of high density to be obtained.

Another object of this invention is to provide an improved winding construction for the rod memory system disclosed in the aforementioned copending patent application and patent, whereby significantly higher rod density arrays can be achieved.

A further object of this invention is to provide a magnetic memory, in accordance with the foregoing objects, which provides a high density rod array as well as being capable of better noise cancellation and faster operation.

Briefly, the above objects are accomplished, in accordance with the present invention, by substituting for the individual separately formed solenoid windings in each array disclosed in the aforementioned patent and application, a solenoid weaving pattern in which the solenoids and the interconnections therebetween are formed for a particular group of rods together, each rod solenoid being formed one portion at a time. The weaving pattern is such that each rod is provided with the desired number of solenoids having the desired number of turns in each solenoid, while at the same time permitting a high density rod array to be obtained.

The specific nature of the invention, as well as other objects, uses and advantages thereof will become apparent from the following description of the invention taken in conjunction with the accompanying drawings in which.

Like numerals designate like elements throughout the figures of the drawings.

Figure 1:
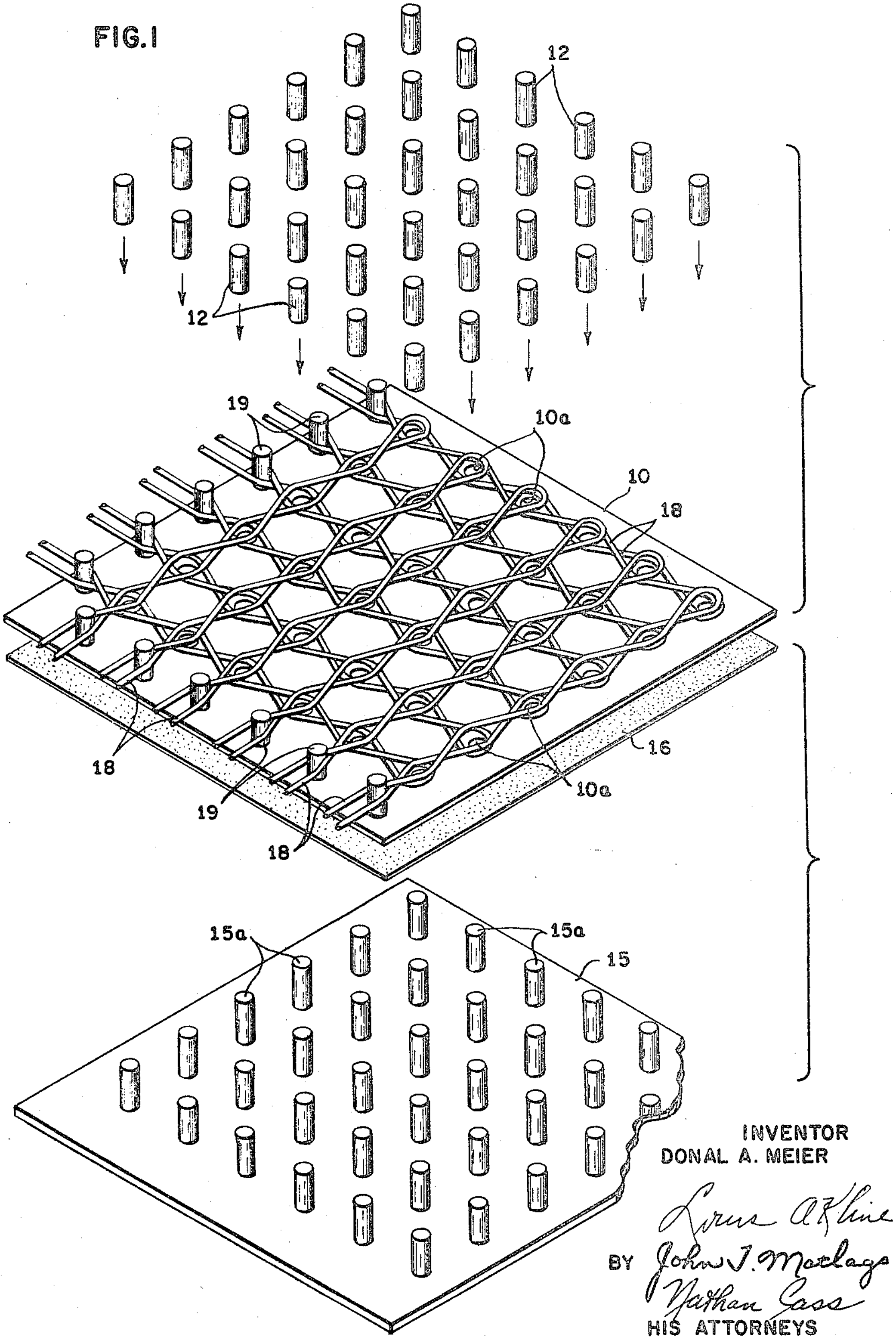
FIG. 1 is a pictorial view, in disassembled relationship, of a rod array having a solenoid weaving pattern formed thereon in accordance with the invention.

Referring initially to FIG. 1, illustrated therein, in disassembled relationship, is a solenoid weaving pattern for a rod array in accordance with the invention. Although only a relatively small number of rods are illustrated in FIG. 1, it will be understood that the array may be as large as desired. Also, the spacing between rows and columns in FIG. 1 is exaggerated for the sake of clarity.

Typically, fabrication begins with the provision of a support in the form of a plate 10 of suitable material upon which the solenoid weaving pattern is to be formed. The plate 10 is provided with an array of apertures 10*a*, each aperture 10*a* being spaced, dimensioned, and adapted to receive a respective one of rigid pins 15*a* fixedly mounted in a supporting plate 15. The pins 15*a* are of sufficient length and so disposed as to extend through respective ones of the apertures 10*a* and protrude above the upper surface of plate 10 when the two plates 10 and 15 are brought into juxtaposition. Pins 15*a* are thereby permitted to serve as dummy rods or mandrels about which the solenoid weaving pattern may be formed. The solenoid weaving pattern may then be cemented or otherwise affixed to plate 10, after which the pins 15*a* can be removed, and the magnetic rods 12 inserted in their place. The magnetic rods 12 may be cemented to retain them in place, or else, strips or a sheet of adhesive film 16 may be applied to the lower face of plate 10 for retention of the magnetic rods.

Figure 2:
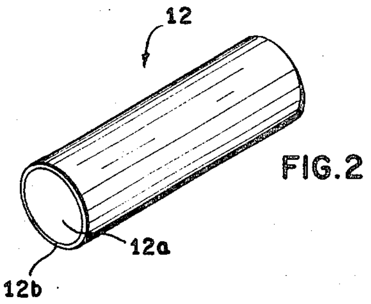
FIG. 2 is a pictorial view illustrating a typical magnetic rod.

The specific nature of a typical magnetic rod 12 is illustrated in FIG. 2, it being understood that the present invention is also applicable to any other type of rod memory where the features of the present invention may be used to advantage. The rod 12 comprises an inner conductive substrate 12*a* which may typically be a beryllium copper rod of about 0.010 inch in diameter, but preferably less than 0.050 inch, on which is electrodeposited a thin bistable magnetic film 12*b* which may typically be a film of 97% iron and 3% nickel with a thickness of 10,000 angstroms or less. The bistable magnetic thin film 12*b* may also be a bilayer film of the type disclosed in the commonly assigned copending patent application Ser. No. 77,451, filed Dec. 21, 1960, namely, a first adherent iron-nickel layer electrodeposited on the beryllium copper rod 12*a* and composed of from about 30% to 90% nickel and from about 70% to 10% iron, and a second adherent iron-nickel layer electrodeposited on the first layer and composed of from about 93% to 99% iron from about 7% to 1% nickel, the composite thickness typically ranging from about 2,000 to 5,000 angstroms.

Figure 3:
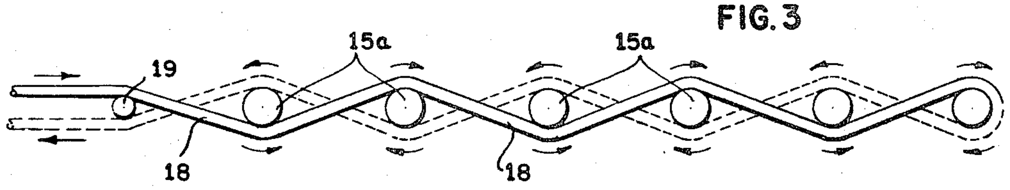
FIG. 3 is a diagrammatic illustration of the solenoid weaving technique of the invention as applied to a single row.
Figure 4:
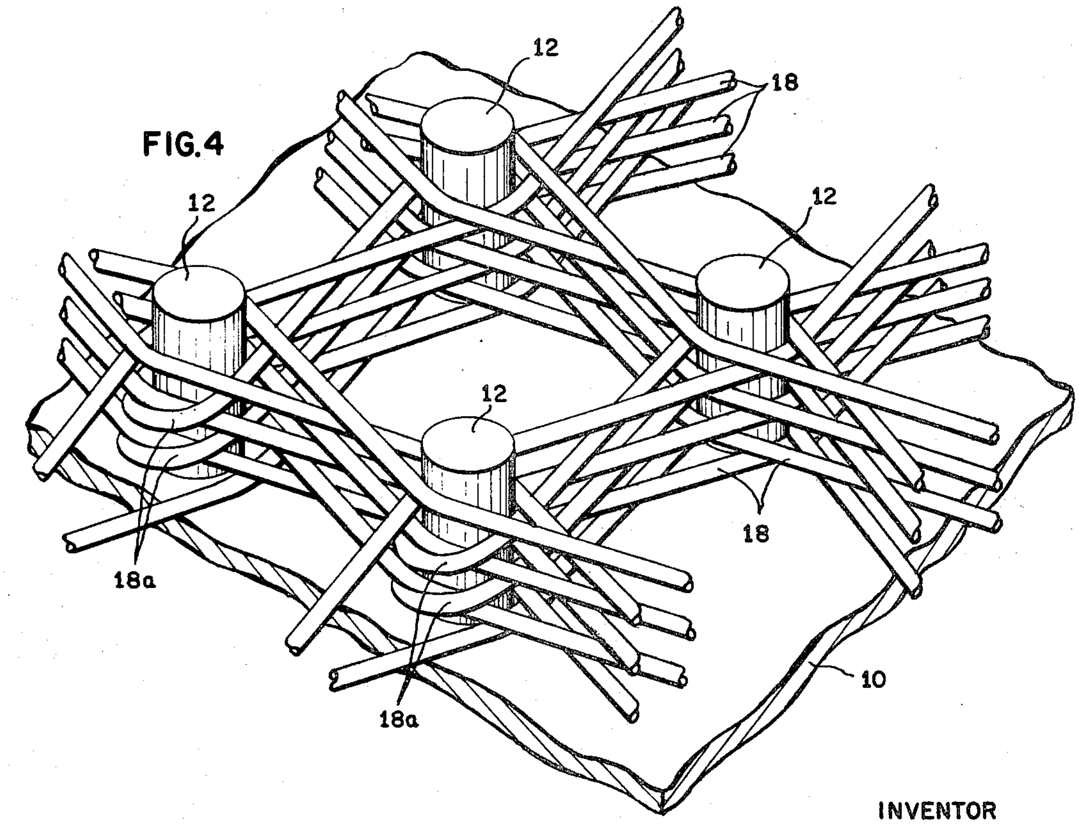
FIG. 4 is a fragmentary view of a woven solenoid rod array having a multiturn row solenoid and a multiturn column solenoid formed at each rod position using the solenoid weaving technique of the present invention.

The solenoid weaving pattern illustrated in FIG. 1 will now be considered in detail along with FIGS. 3 and 4. It will be understood that an insulated conductive wire 18 is employed for weaving. In weaving a particular row (or column), the wire 18, beginning with a respective guide pin 19, is woven back and forth between the dummy pins 15*a* (which are ultimately replaced by rods 12 as described previously) until the end of the row (or column) is reached, as illustrated by the solid line in FIG. 3. This produces the equivalent of a one-half solenoid turn for each rod position. Then, by bringing the wire 18 around the last pin at the end of the row and weaving it back along the row in the reverse direction, as shown by the dashed line in FIG. 3, the weaving pattern shown in FIG. 1 is obtained for each row (or column), producing the equivalent of a one-turn solenoid at each rod position.

Figure 5:
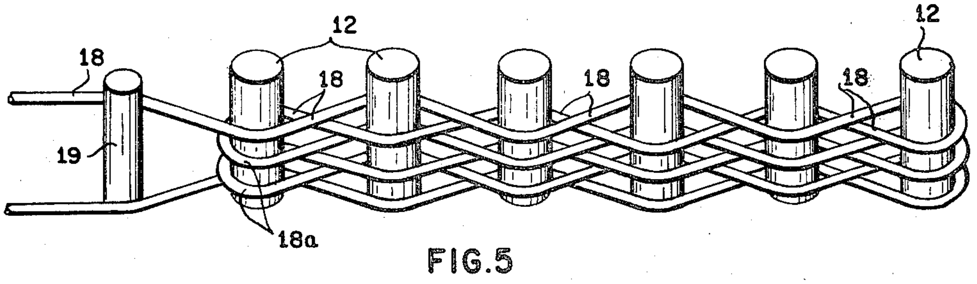
FIG. 5 is a pictorial view illustrating a typical row in the array of FIG. 4.

Although FIG. 1 illustrates a solenoid weaving pattern having only a one-turn row solenoid and only a one-turn column solenoid at each rod position, it is to be understood that additional solenoid turns may be provided simply by repeating the weaving shown in FIG. 3 for each row and/or column as many times as desired, and connecting the weavings for respective rows and columns in series. FIG. 4, for example, illustrates a portion of a woven solenoid rod array having a three-turn row solenoid and a three-turn column solenoid formed at each rod position using the solenoid weaving technique of the present invention. The spacing between weavings is exaggerated in FIG. 4, as is also done in other figures, for the sake of clarity. Preferably, the multiple row and column weavings are intermixed as illustrated in FIG. 4. Also, the multiple weavings for each row (or column) may be connected in series using a single unbroken wire 18 merely by using the wire from each previous row (or column) to form the weaving for the next row, as illustrated by the wire portions 18*a* in FIG. 4, and as illustrated in FIG. 5 for a typical row.

Figure 6:
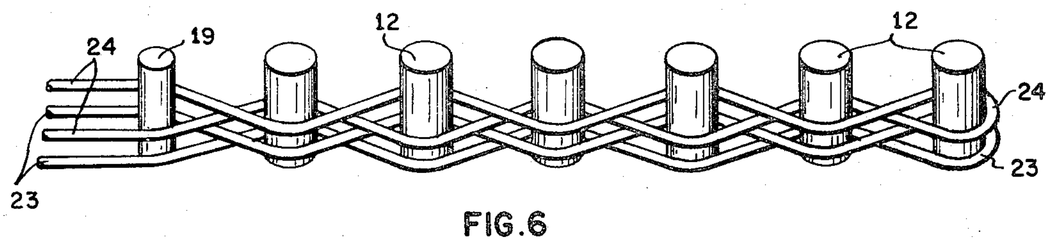
FIG. 6 is a pictorial view illustrating how two separate solenoid weavings can be provided in a row of a rod array in accordance with the invention.

It is also to be understood that additional solenoid windings for a row or column may be provided in the same manner as additional turns, except that, in this case, the additional weavings would be connected to their appropriate respective circuitry, rather than being connected in series with the other weavings, as illustrated in FIG. 6 for a typical row in which numerals 23 and 24 indicate two separate row weavings, each weaving providing a one-turn solenoid at each rod position.

From the description so far it should be evident that the use of the solenoid weaving pattern for providing solenoids for the rods, as just described, permits the rods to be placed very much closer together than if the solenoids were wound individually, as in the aforementioned patent and patent applications. This is because, with presently known winding techniques (as disclosed, for example, in the commonly assigned copending application Ser. No. 206,759, filed July 2, 1962), a relatively large spacing must be provided in order to permit solenoids to be individually wound at each rod position. On the other hand, as will be apparent from FIGS. 1, 3 and 4, the solenoid weaving pattern of the present invention requires a rod spacing very little more than the diameter of the wire 18, so that rod spacing is now dictated primarily by electrical and magnetic considerations, rather than by winding limitations.

An additional advantage of the solenoid weaving pattern of the present invention, is that the more compact rod array made possible thereby permits higher speed operation, first, because the rows and columns are closer together and thus reduce line inductance and propagation times, and second, because a more uniform array results which permits better noise cancellation.

So far, the solenoid weaving technique of this invention has been illustrated only in connection with providing the series connected solenoids for a row or column. However, this solenoid weaving technique is also applicable for providing the solenoid windings for an array constituting a digit plane in which all solenoids are connected in series, as illustrated, for example, in FIG. 7 in which a single unbroken wire 18 is used throughout the array. FIG. 8 illustrates one way in which a two-turn solenoid can be provided at each rod position in the array of FIG. 7 by forming a double weaving in each row before proceeding to the next row, whereby the entire weaving for the array can be accomplished using the single unbroken wire 18.

Figure 7:
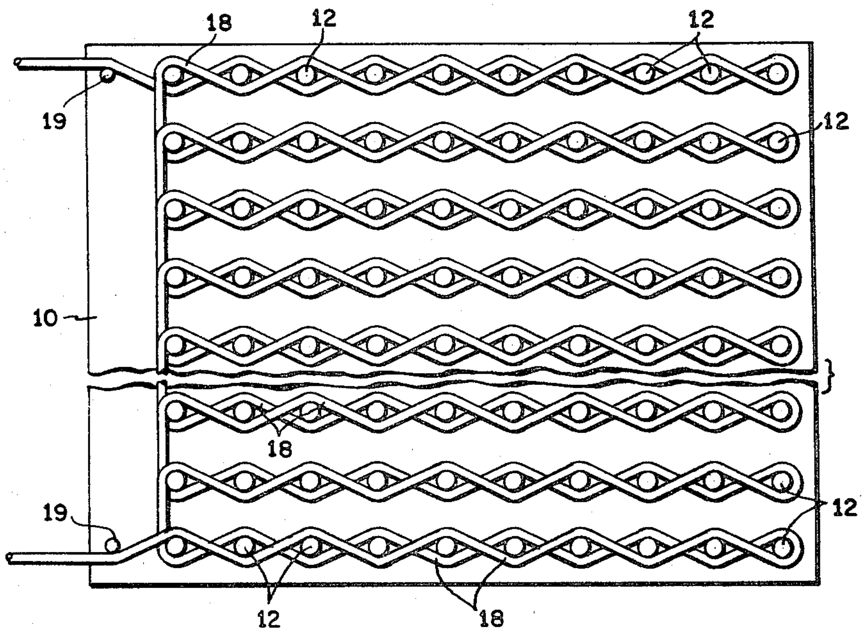
FIG. 7 is a plan view illustrating how a solenoid weaving pattern can be provided for a digit plane of a rod array.
Figure 8:
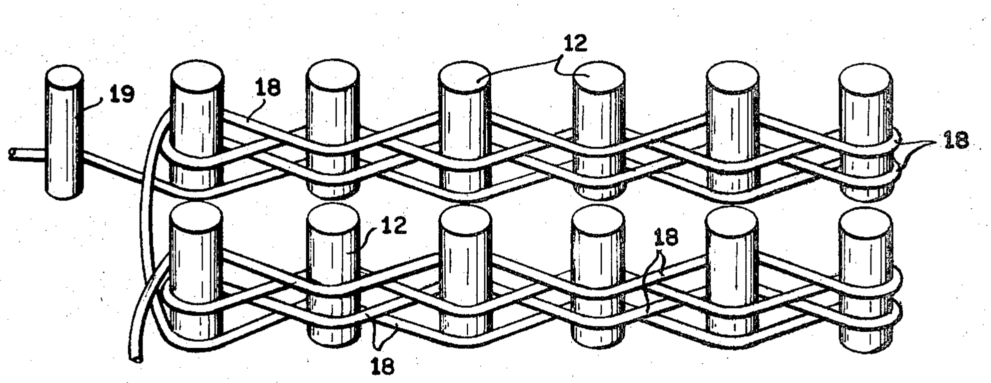
FIG. 8 is a pictorial view illustrating one way of providing a multiturn solenoid at each rod position in the arrays of FIGS. 7, 9 and 10.

It will be understood that the digit plane solenoid weaving pattern illustrated in FIGS. 7 and 8 may be substituted for either of the row and column weavings in the array of FIG. 1, or added thereto, without detracting from the rod density capability, since this digit plane weaving pattern may merely be woven over the row and column weavings, or intermixed therewith, as desired.

Figure 9:
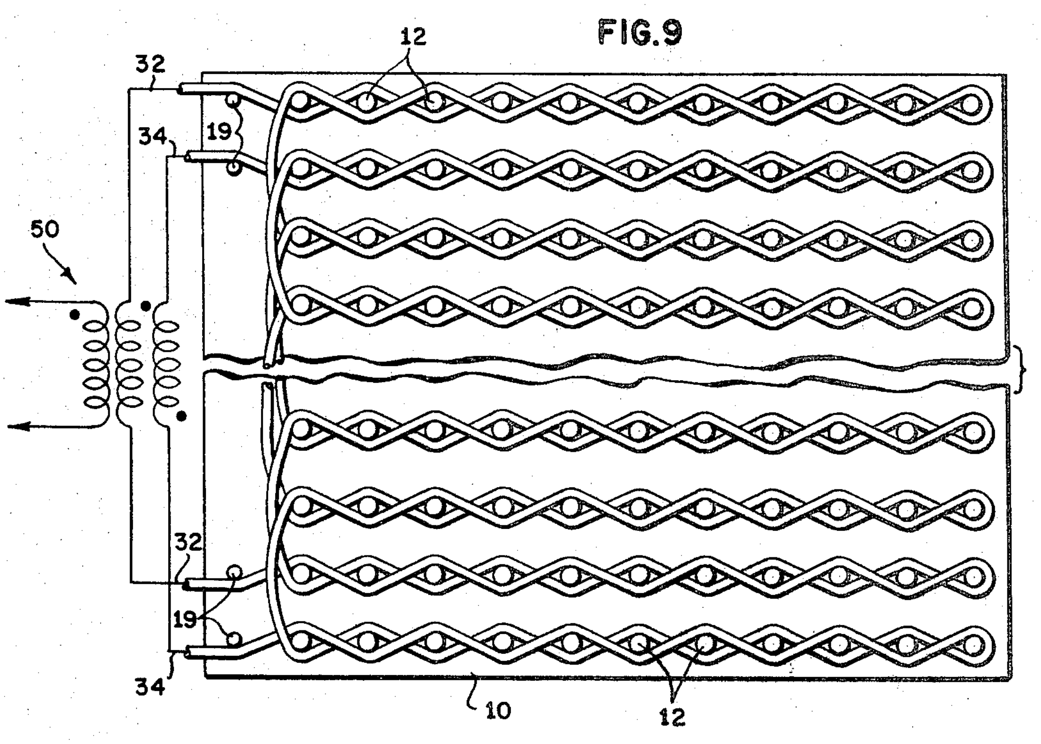
FIGS. 9 and 10 are plan views illustrating two ways of providing a solenoid weaving pattern for a digit plane of a rod array suitable for use in obtaining common mode rejection.
Figures 10, 11:
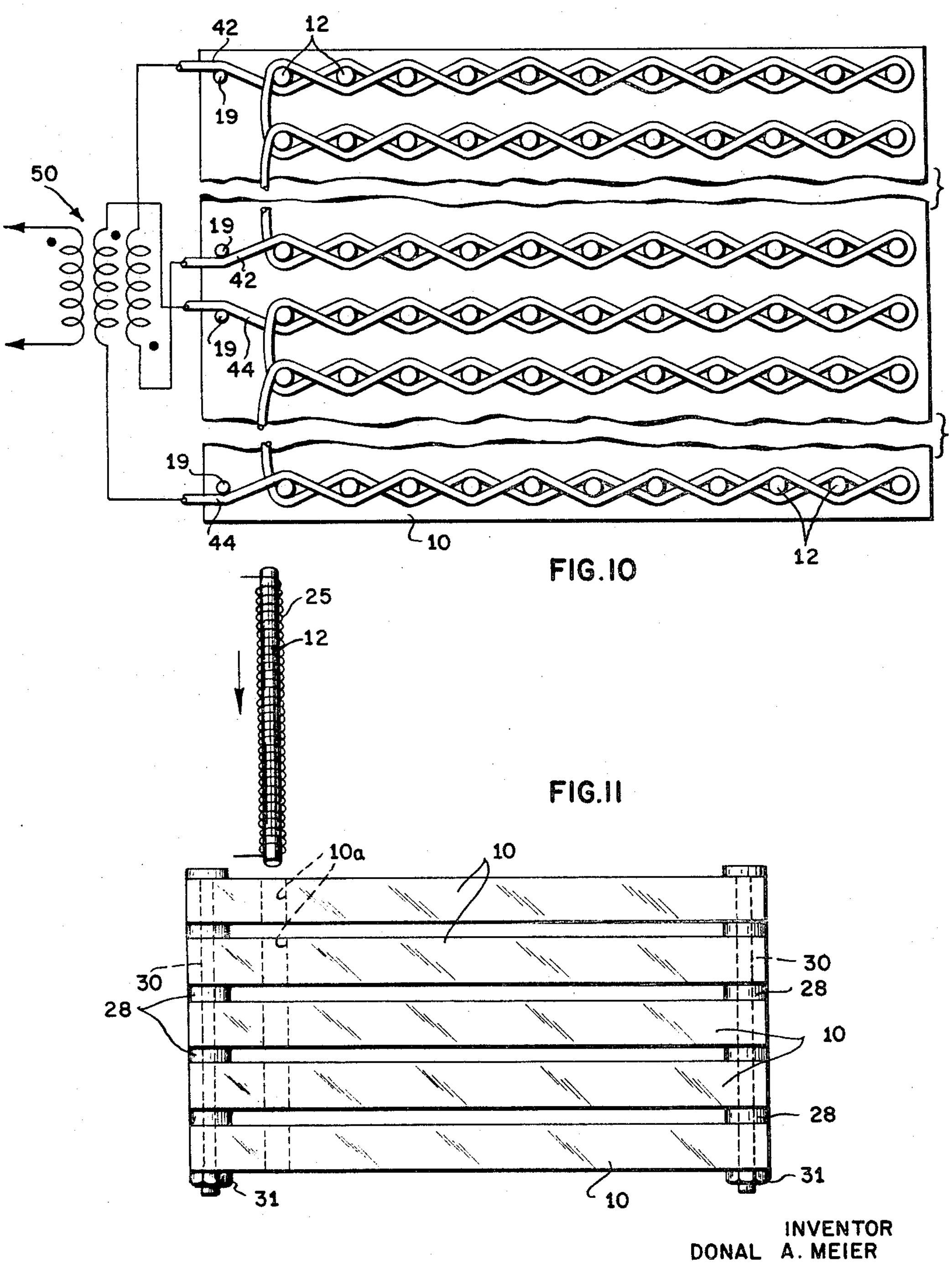
FIG. 11 is a view illustrating how a three-dimensional rod memory matrix can be provided employing solenoid weaving in each array in accordance with the invention.

FIGS. 9 and 10 also illustrate possible digit plane solenoid weaving patterns in accordance with the invention, with the additional feature that the digit plane weaving is divided into two like weaving patterns (32 and 34 in FIG. 9 and 42 and 44 in FIG. 10) suitable for use in obtaining common mode rejection by suitable connection to a sense amplifier transformer 50. It will be understood that multiturn solenoid windings can be provided for the arrays of FIGS. 9 and 10 by using the row weaving arrangement of FIG. 8.

It will also be understood that although only single rod arrays have so far been considered herein, the solenoid weaving technique of the invention may also be employed in connection with a three-dimensional rod matrix, such as disclosed in the aforementioned Patent No. 3,134,965. The manner in which this may be accomplished in illustrated in FIG. 11, which illustrates a three-dimensional matrix comprised of a plurality of similar plates 10 stacked with their apertures 10*a* aligned and suitably spaced by spacers 28. Pins 30 and nuts 31 pass through suitably provided aligned holes in plates 10 and spacers 28 to hold the matrix together. Each of the magnetic rods 12 (only one of which is illustrated in FIG. 11 for the sake of clarity) is made of sufficient length to pass through its respective aligned apertures 10*a* in all of the stacked plates 10, and each rod 12 may or may not have a coaxial winding 25 provided thereon, depending on the memory organization employed.

Each of the plates 10 in FIG. 11 is constructed as illustrated in FIG. 1 and may contain any desired combination of the various possible solenoid weaving patterns previously illustrated herein. For example, each plate 10 may contain the row and column three-turn solenoid weavings for coincident selection, as illustrated in FIG. 4, with the addition of the digit plane winding of FIG. 9 for sensing purposes. Alternatively, each plate 10 may contain merely the three-turn solenoid row weavings illustrated in FIG. 5, with digit windings being provided by the coaxial winding 25 on each rod 12, in which case the coaxial windings serve as both digit and sense windings. As a further example, each plate 10 may merely contain the digit plane solenoid weaving illustrated in FIG. 9 with multiple turns provided as in FIG. 8, and the coaxial winding on each rod 12 may then be used as the remaining winding. These examples are merely exemplary, and others are possible, depending on the particular memory organization employed.

Accordingly, it is to be understood that the present invention is not limited to the particular embodiments disclosed herein, but is intended to include all modifications, variations, and uses coming within the scope of the invention as defined in the appended claims.

What is claimed is:

1. A method of fabricating a rod memory having an array of solenoid windings, comprising: forming a plate having a plurality of rows and columns of apertures therein of diameter slightly greater than the diameter of each rod, inserting dummy pins into said apertures for use in forming said windings, forming a plurality of first coordinate drives by weaving a first insulated conductive wire from pin to pin in each row starting with a pin at one end of the row and ending with a pin at the other end of the row so that the wire passes by adjacent pins in each row on opposite sides thereof, and then weaving a second insulated conductive wire from pin to pin in each row in the same manner as said first wire except that said second wire is woven past each pin on the opposite side from said first wire, forming a plurality of second coordinate drives by weaving first and second insulated conductive wires from pin to pin in each column in the same manner as for each row of pins of said first coordinate drives, the second coordinate drives forming with said first coordinate drives two coincident drives for each pin for selective switching of magnetic rods, the combination of said first and second coordinate drives being different for each pin, affixing the weavings in place on said plate, removing said pins from said apertures, and inserting and affixing bistable magnetic rods in respective ones of said apertures.

2. A method of fabricating a rod memory having an array of solenoid windings, comprising: forming a plate having a plurality of rows and columns of apertures therein of diameter slightly greater than the diameter of each rod, inserting dummy pins into said apertures for use in forming said windings, forming a plurality of first coordinate drives by weaving a first plurality of insulated conductive wires from pin to pin in each row starting with a pin at one end of the row and ending with a pin at the other end of the row so that each wire passes by adjacent pins in each row on opposite sides thereof, and weaving a second plurality of insulated conductive wires from pin to pin in each row in the same manner as said first plurality except that each wire of said second plurality passes by each pin on the opposite side from each wire of said first plurality, forming a plurality of second coordinate drives by weaving first and second pluralities of insulated conductive wires from pin to pin in each column in the same manner as for each row of pins of said first coordinate drives, the second coordinate drives forming with said first coordinate drives two coincident drives for each pin for selective switching of magnetic rods, the combination of said first and second coordinate drives being different for each pin, affixing the weavings in place on said plate, removing said pins from said apertures, and inserting and affixing bistable magnetic rods in respective ones of said apertures.

3. A method of fabricating a rod memory having an array of solenoid windings, comprising: forming a plate having a plurality of rows and columns of apertures therein of diameter slightly greater than the diameter of each rod, inserting dummy pins into said apertures for use in forming said windings, forming a plurality of first coordinate drives by weaving a single unbroken insulated conductive wire from pin to pin in each row starting with a pin at one end of the row and ending with a pin at the other end of the row so that the wire passes by adjacent pins in the row on opposite sides thereof, then looping the wire around the pin at said other end of the row and weaving the wire from pin to pin back to said first end of the row in the same manner as before except on the opposite side of each pin, and then looping the wire around the pin at said first end of the row and repeating the previously described weaving to said other end and back again at least one more time, forming a plurality of second coordinate drives by weaving a single unbroken insulated conductive wire from pin to pin in each column in the same manner as for each row of pins of said first coordinate drives, the second coordinate drives forming with said first coordinate drives two coincident drives for each pin for selective switching of magnetic rods, the combination of said first and second coordinate drives being different for each pin, affixing the weavings in place on said plate, removing said pins from said apertures, and inserting and affixing bistable magnetic rods in respective ones of said apertures.

References Cited

UNITED STATES PATENTS

| | | | |
|---|---|---|---|
| 3,134,965 | 5/1964 | Meier | 340—174 |
| 3,221,312 | 11/1965 | MacLachlan | 340—174 |
| 381,272 | 4/1888 | Murphy et al. | 139—34 |
| 1,540,595 | 1/1925 | Brauer | 139—34 |
| 2,910,673 | 10/1959 | Bloch | 340—174 |
| 2,934,748 | 4/1960 | Steimen | 340—174 |
| 2,961,745 | 11/1960 | Smith | 29—155.5 |
| 2,985,948 | 5/1961 | Peters | 29—155.5 |

CHARLIE T. MOON, *Primary Examiner.*

C. E. HALL, *Assistant Examiner.*

U.S. Cl. X.R.

29—605; 340—174